United States Patent
Pritchard et al.

(10) Patent No.: US 10,780,773 B2
(45) Date of Patent: Sep. 22, 2020

(54) ELECTRIC ALL WHEEL DRIVE TWO SPEED WITH CHAIN DROP

(71) Applicant: BorgWarner Inc., Auburn Hills, MI (US)

(72) Inventors: Larry A. Pritchard, Macomb, MI (US); Philip John Francis, Lapeer, MI (US)

(73) Assignee: BorgWarner Inc., Auburn Hills, MI (US)

( * ) Notice: Subject to any disclaimer, the term of this patent is extended or adjusted under 35 U.S.C. 154(b) by 145 days.

(21) Appl. No.: 15/981,116

(22) Filed: May 16, 2018

(65) Prior Publication Data

US 2019/0351756 A1 Nov. 21, 2019

(51) Int. Cl.
*B60K 6/365* (2007.10)
*B60K 6/52* (2007.10)
(Continued)

(52) U.S. Cl.
CPC ............... *B60K 6/52* (2013.01); *B60K 6/365* (2013.01); *B60K 6/405* (2013.01); *B60K 6/48* (2013.01); *B60K 6/547* (2013.01); *F16D 25/123* (2013.01); *F16H 37/082* (2013.01); *F16H 57/035* (2013.01); *F16H 57/037* (2013.01); *F16H 57/046* (2013.01); *F16H 57/05* (2013.01); *B60Y 2200/92* (2013.01); *B60Y 2300/18125* (2013.01); *F16D 2048/0209* (2013.01); *F16D 2048/0221* (2013.01); *F16H 2057/02034* (2013.01); *F16H 2200/0034* (2013.01);
(Continued)

(58) Field of Classification Search
CPC .......... B60K 6/52; B60K 6/547; B60K 6/365; F16H 37/082; F16H 7/035; F16H 7/037; F16H 57/046; F16H 57/05; F16H 2057/02034; F16H 2200/0034; F16H 2200/2007; F16H 2200/2097
See application file for complete search history.

(56) References Cited

U.S. PATENT DOCUMENTS

2006/0281597 A1* 12/2006 Williams ............ B60K 17/344
475/198
2007/0123383 A1* 5/2007 Yokoyama ............ B60K 6/365
475/5
(Continued)

OTHER PUBLICATIONS

Pritchard et al., U.S. Appl. No. 15/452,873 "Electric All-Wheel Drive Two Speed With Split Double Reduction Planetary", filed Mar. 8, 2017.

*Primary Examiner* — Stacey A Fluhart
(74) *Attorney, Agent, or Firm* — Young Basile Hanlin & MacFarlane, P.C.

(57) ABSTRACT

A driveline comprising an electrical machine, a chain drive, a first planetary gear set, a second planetary gear set, a range selector, a differential, and an axle assembly, wherein the electrical machine is constructed and arranged to selectively transmit power to the differential through the chain drive, the first planetary gear set, the range selector, and the second planetary gear set or to selectively receive power through the chain drive, the first planetary gear set, the range selector, the second planetary gear set, and the differential, and wherein the range selector is configured to selectively shift the driveline into a high range, a low range, and a neutral mode.

17 Claims, 2 Drawing Sheets

(51) Int. Cl.

| | |
|---|---|
| *B60K 6/405* | (2007.10) |
| *B60K 6/48* | (2007.10) |
| *B60K 6/547* | (2007.10) |
| *F16H 37/08* | (2006.01) |
| *F16H 57/05* | (2006.01) |
| *F16H 57/04* | (2010.01) |
| *F16H 57/037* | (2012.01) |
| *F16H 57/035* | (2012.01) |
| *F16D 25/12* | (2006.01) |
| *F16H 57/02* | (2012.01) |
| *F16D 48/02* | (2006.01) |

(52) U.S. Cl.
CPC ............ *F16H 2200/2005* (2013.01); *F16H 2200/2064* (2013.01); *F16H 2200/2094* (2013.01); *Y10S 903/911* (2013.01); *Y10S 903/916* (2013.01); *Y10S 903/919* (2013.01); *Y10S 903/952* (2013.01)

(56) References Cited

U.S. PATENT DOCUMENTS

| | | | |
|---|---|---|---|
| 2013/0130857 A1* | 5/2013 | Gassmann | B60K 1/00 475/150 |
| 2013/0203543 A1* | 8/2013 | Sten | F16H 48/36 475/150 |
| 2015/0323059 A1* | 11/2015 | Pritchard | F16H 57/0456 184/15.1 |
| 2016/0025200 A1* | 1/2016 | Petersen | B60K 1/00 475/204 |
| 2018/0080536 A1* | 3/2018 | Nilsson | F16H 48/36 |
| 2019/0263243 A1* | 8/2019 | Kurth | B60K 1/00 |
| 2019/0299766 A1* | 10/2019 | Takada | B60K 6/52 |

* cited by examiner

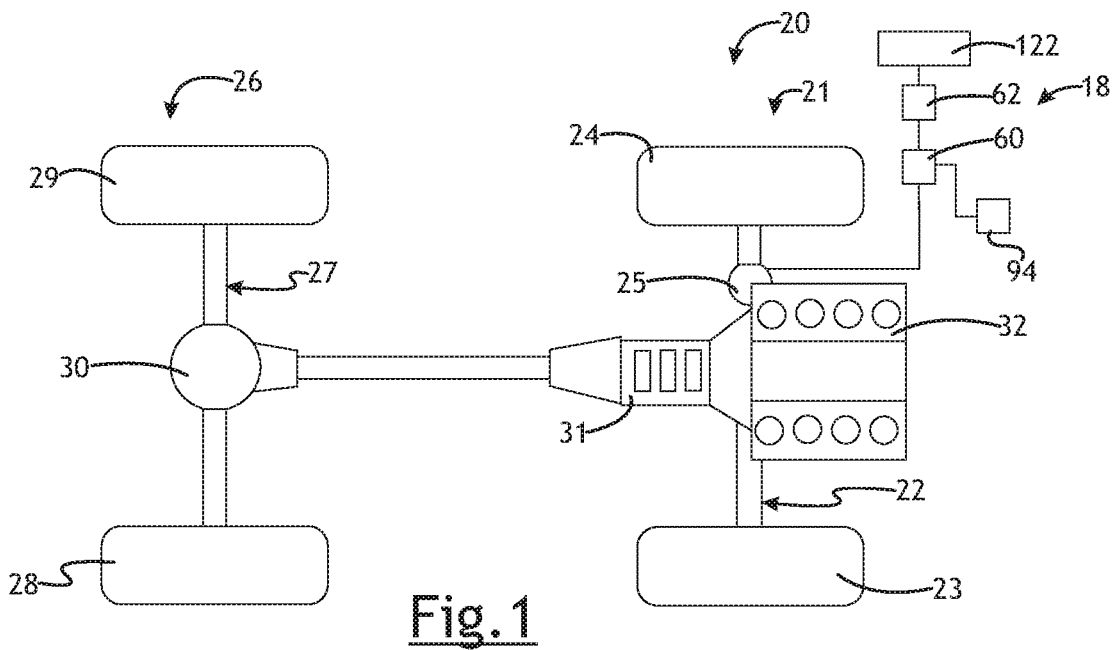
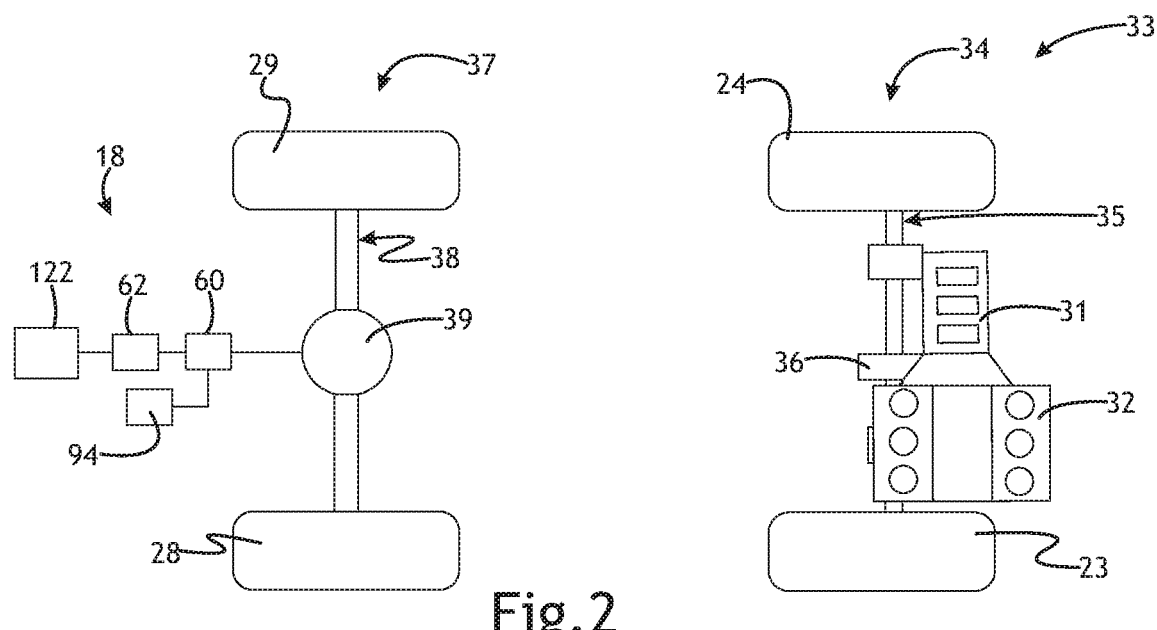

ELECTRIC ALL WHEEL DRIVE TWO SPEED WITH CHAIN DROP

TECHNICAL FIELD

The field to which the disclosure generally relates to includes vehicle powertrains.

BACKGROUND

A vehicle powertrain may include at least one driveline which may drive the vehicle.

SUMMARY OF ILLUSTRATIVE VARIATIONS

A number of variations may include a driveline comprising: an electrical machine; a chain drive operatively connected to the electrical machine; a first planetary gear set having multiple gear ratios operatively connected to the chain drive; a second planetary gear set having a fixed gear ratio operatively connected to the first planetary gear set; a range selector operatively connected to the first planetary gear set and positioned between the first planetary gear set and the second planetary gear set; a differential operatively connected to the second planetary gear set; an axle assembly operatively connected to and extending through the chain drive, the first planetary gear set, the range selector, the second planetary gear set, and the differential; wherein the electrical machine is constructed and arranged to selectively transmit power to the differential through the chain drive, the first planetary gear set, and the second planetary gear set or to selectively receive power through the chain drive, the first planetary gear set, the second planetary gear set, and the differential; and wherein the range selector is constructed and arranged to selectively shift the driveline into a high range mode, a low range mode, and a neutral mode.

A number of variations may include a driveline comprising: an axle assembly comprising a first axle and a second axle coaxial with the first axle; a chain drive operatively connected to the axle assembly; a first helical planetary gear set including a sun gear, at least two planetary gears operatively connected to the sun gear, a ring gear, and a carrier, wherein the first helical planetary gear set is operatively connected to the chain drive and the first axle; a range selector operatively connected to the first helical planetary gear set and the first axle; a second helical planetary gear set including a sun gear, at least two planetary gears operatively connected to the sun gear, a ring gear, and a carrier, wherein the second helical planetary gear set is operatively connected to the first helical planetary gear set; a differential operatively connected to the second helical planetary gear set, the first axle, and the second axle; an electrical machine having a shaft operatively connected to the chain drive constructed and arranged to selectively drive or be driven by the chain drive; a housing surrounding at least a portion of the axle assembly, the chain drive, the first helical planetary gear set, the range selector, the second helical planetary gear set, and the differential; and wherein the range selector is constructed and arranged to axially move the ring gear of the first helical planetary gear set to shift the driveline to a high range mode, a neutral mode, and a low range mode.

A number of variations may include a method of driving an axle differential comprising: providing an electrical machine having a rotatable shaft; driving a chain system operatively connected to the rotatable shaft using the electrical machine; providing output from the chain system to a first planetary gear set having a sun gear, at least two planetary gears, a ring gear, and a carrier; shifting the ring gear to a first position to ground the ring gear to a housing to achieve a low range mode using a range selector or shifting the ring gear to a second position operatively connecting the ring gear to the carrier to achieve a high range mode using the range selector; driving a second planetary gear set with output from the first planetary gear set through the range selector; and driving the axle differential with output from the second planetary gear set.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a schematic of a vehicle powertrain according to a number of variations.

FIG. 2 illustrates a schematic of a vehicle powertrain according to a number of variations.

DETAILED DESCRIPTION OF ILLUSTRATIVE VARIATIONS

Figure 3:
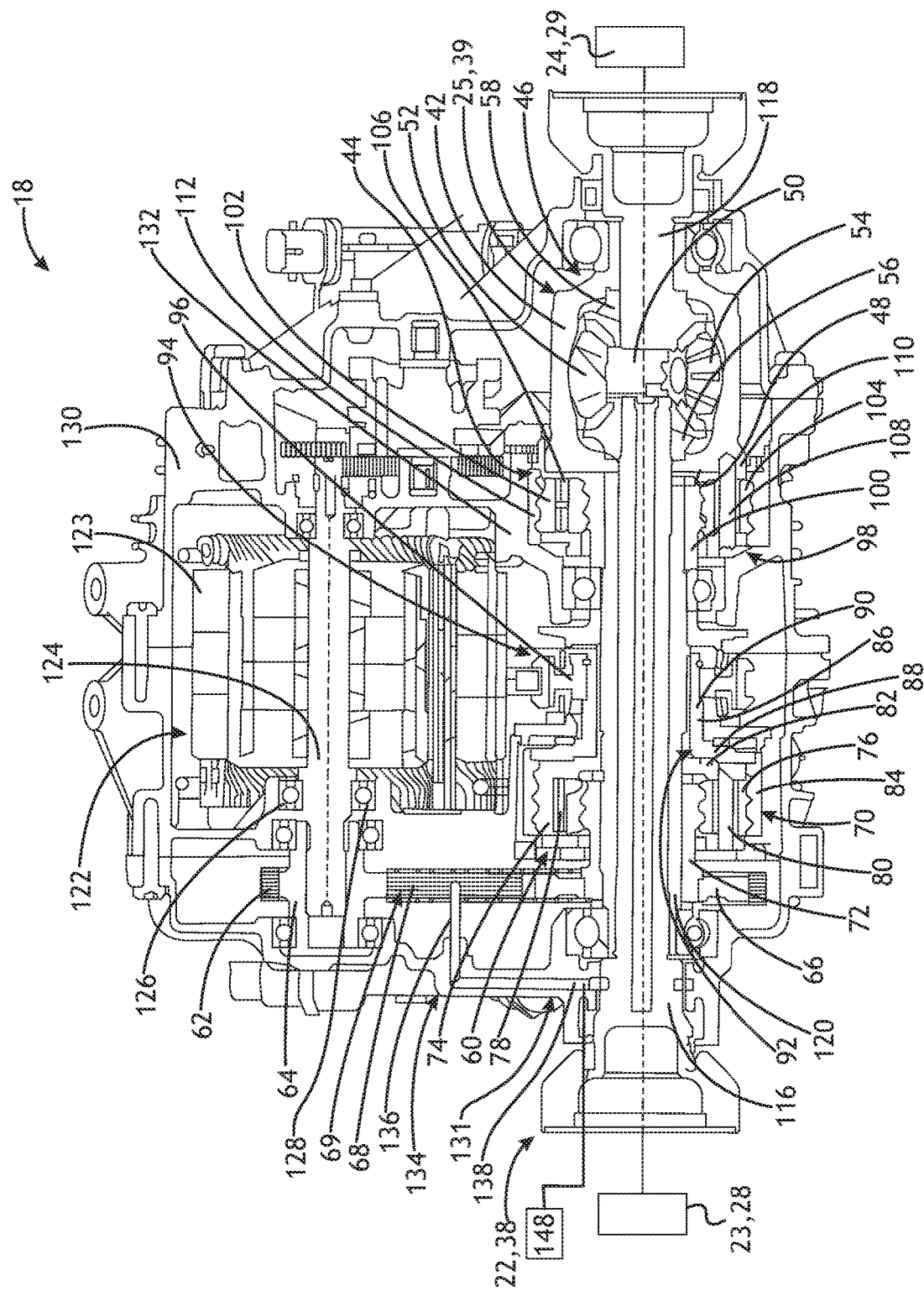
FIG. 3 illustrates a cross-section of a driveline according to a number of variations.

The following description of the variations is merely illustrative in nature and is in no way intended to limit the scope of the invention, its application, or uses.

Referring to FIGS. 1 and 2, in a number of variations, an electrified all-wheel drive two speed vehicle 20, 33 including, but not limited to, a 48-volt electrified all-wheel drive two speed vehicle, may include an electrified axle assembly 18. In a number of variations, the electrified axle assembly 18 may include an axle assembly 22, 38 that may selectively be driven by or may drive an electrical machine 122. The electrical machine 122 may transfer power to an output differential 25, 39 of the axle assembly 22, 38 through a reduction gear train 60. A range selector 94 may be operatively attached to the reduction gear train 60 to shift the reduction gear train 60 between a low range mode, a high range mode, and a neutral mode, as will be discussed hereafter. Any number of electrical machines 122 may be used including, but not limited to, a motor, a motor-generator, or other electrical machine.

In a number of variations, the electric machine 122 may include a permanent magnet motor. The permanent magnet motor may be substantially square so that the length of the stator 123 and the diameter of the stator 123 may be substantially the same, which may maximize efficiency of the motor 122 (FIG. 3). This may require that the motor 122 be mounted off axis from the reduction gear train 60, the range selector 94, and the output differential 25, 39.

In another variation, it may be desirable to reuse a belt alternator starter (BAS) motor as the propulsion device 122 of the axle assembly 22, 38, which may also require that the motor 122 to be mounted off-axis from the reduction gear train 60, range selector 94, and output differential 25, 39.

In a number of variations, a chain drive 62 may be used to transfer rotational power from the electrical machine 122 to an output differential 25, 39 mounted off-axis from the electrical machine 122. The chain drive 62 may be operatively connected to the electrical machine 122 and may transfer power from the electrical machine 122 to the output differential 25, 39 of the axle assembly 22, 38 through a reduction gear train 60 selectively operating in a low range mode or a high range mode through a range selector 94, as will be discussed hereafter. Further, the chain drive 62 may transfer power from the output differential 25, 39 to the electrical machine 122 through the reduction gear train 60, as will be discussed hereafter.

Referring to FIG. 3, in a number of variations, the chain drive 62 may be operatively attached to the reduction gear train 60. The reduction gear train 60 may comprise a first planetary gear set 70 and a second planetary gear set 98. A range selector 94 may be operatively connected to the first planetary gear set 70 and positioned between the first planetary gear set 70 and the second planetary gear set 98. The second planetary gear set 98 may be operatively connected to the output differential 25, 39 and the first planetary gear set 70. In a number of variations, the second planetary gear set 98 may provide for fixed gear ratios, while the first planetary gear set 70 may provide for multiple gear ratios. The output of the first planetary gear set 70 may be transferred to the second planetary gear set 98 in conjunction with the range selector 94 so that the driveline 21, 37 may operate in a low range mode, a neutral mode, and a high range mode. The configuration of the range selector 94 positioned between the first and second planetary gear sets 70, 98 may provide a reflected inertia at the range selector 94 that may be lower than if the range selector 94 was positioned after both the first planetary gear set 70 and the second planetary gear set 98.

In a number of variations, a housing 130 may surround at least a portion of the electrical machine 122, the chain drive 62, the first planetary gear set 70, the range selector 94, the second planetary gear set 98, and the output differential 25, 39. The housing 130 may comprise a single continuous component or may comprise two or more separate components. In a number of variations, the housing 130 may be constructed and arranged to contain a lubricant including, but not limited to, oil.

In a number of variations, the axle assembly 22, 38 may be operatively attached to a first wheel 23, 28 and a second wheel 24, 29. Any number of axle assembly configurations may be used including, but not limited to, axle assemblies including constant velocity joints and other common components known to those skilled in the art. In a number of variations, the axle assembly 22, 38 may include a first axle shaft 116 and a second axle shaft 118 coaxial with the first axle shaft 116. A hollow centerline support shaft 120 may surround at least a portion of the first axle shaft 116 and may be concentric with the first axle shaft 116. The first axle shaft 116 may extend through the chain drive 62, the first planetary gear set 70, the range shifter 94, and the second planetary gear set 98. The output differential 25, 39 may be interposed between the first axle shaft 116 and the second axle shaft 118 and may be operatively attached to the first axle shaft 116 and the second axle shaft 118.

In a number of variations, the output differential 25, 39 may comprise a cage 42 and a pinion shaft 50, which may extend between a first end 44 of the cage 42 and a second end 46 of the cage 42. In a number of variations, a first pinion gear 52 and a second pinion gear 54 may be rotatably attached to the pinion shaft 50. A first side gear 56 may be attached to the first axle shaft 116 so that it may rotate with the first axle shaft 116 and a second side gear 58 may be attached to the second axle shaft 118 so that it may rotate with the second axle shaft 118. The first side gear 56 may engage the first pinion gear 52 and the second side gear 58 may engage the second pinion gear 54. In a number of variations, the second planetary gear set 98 may be operatively connected to the cage 42. A first side 48 of the cage 42 may be connected to or may be integral with a carrier 110 of the second planetary gear set 98 so that the cage 42 may rotate with the carrier 110. In a number of variations, rotation of the cage 42 may cause the first and second pinion gears 52, 54 and the first and second side gears 56, 58 to rotate, which may cause the first axle shaft 116 and the second axle shaft 118 to rotate driving the wheels 23, 24, 28, 29. Alternately, input may be provided from the wheels 23, 24, 28, 29 to the axle assembly 22, 38, which may cause the first and second axle shafts 116, 118 to rotate the first and second side gears 56, 58, which may cause the first and second pinion gears 52, 54 to rotate, causing rotation of the cage 42 driving the second planetary gear set 98, the first planetary gear set 70, the chain drive 62, and the electrical machine 122, such as for regenerative braking to charge the vehicle battery.

In a number of variations, a shaft 124 including, but not limited to, a rotor shaft may extend from the electrical machine 122 and may be supported by a first and second bearing 126, 128. In a number of variations, the shaft 124 from the electrical machine 122 may be operatively connected to the chain drive 62 so that it may rotate with the chain drive 62. In a number of variations, the chain drive 62 may be used to provide input to the reduction gear train 60 from the electrical machine 122 or may be used to provide output from the reduction gear train 60 to the electrical machine 122. In a number of variations, the chain drive 62 may include a first gear 64, which may be operatively attached to the shaft 124 of the electrical machine 122 so that it may rotate with the electrical machine shaft 124, and a second gear 66 which may be operatively attached to a sun gear 72 of the first planetary gear set 70. The first gear 64 and the second gear 66 may rotate around parallel axes. A chain 68 may extend around the first gear 64 and the second gear 66. In a number of variations, rotation of the first gear 64 may cause the chain 68 and therefore the second gear 66 to rotate or rotation of the second gear 66 may cause the chain 68 and therefore the first gear 64 to rotate. Any number of chains 68 may be used including, but not limited to, silent chains having a plurality of plates and a plurality of pins such as a high capacity, high velocity, and involute tooth (Hy-Vo®) chain. The use of a chain drive 62 to operatively connect the electrical machine shaft 124 and the sun gear 72 of the first planetary gear set 70 may allow for the electrical machine shaft 124 to be positioned near the first axle shaft 116, which may minimize packaging space of the electrified axle assembly 18.

In a number of variations, the second gear 66 may be operatively attached to the sun gear 72 of the first planetary gear set 70 or may be integral with the sun gear 72 so that the sun gear 72 and the second gear 66 may rotate together. In a number of variations, the sun gear 72 may freely rotate on the centerline support shaft 120. In a number of variations, the sun gear 72 may be rotatably connected to at least a first planetary gear 74 and a second planetary gear 76 so that the first and second planetary gears 74, 76 drive or are driven by the sun gear 72. The first planetary gear 74 may rotate on a first pin 78 that may be fixed to a carrier 82 and the second planetary gear 76 may rotate on a second pin 80 that may also be fixed to the carrier 82. It is noted that more than two planetary gears may be used depending on design requirements. The first planetary gear 74 and the second planetary gear 76 may engage with and rotate within an annulus or ring gear 84. In a number of variations, the ring gear 84 may also include a hub 86 that may include a first portion 88, which may extend radially toward the centerline support shaft 120, and a second portion 90, which may extend axially along the centerline support shaft 120 from an end 92 of the first portion 88. In a number of variations, the ring gear hub 86 may be constructed and arranged to engage with the range selector 94, as will be discussed hereafter. The first planetary gear set 70 may comprise any number of types of gears including, but not limited to, helical gears.

Any number of types of range selectors 94 may be used, including, but not limited to, a synchronizer, to allow for smooth shifting of the driveline 21, 37 between the low range, high range, and neutral mode. In a number of variations, a synchronizer 94 may comprise a synchronizer hub 96. The synchronizer hub 96 may be constructed and arranged to engage the ring gear hub 86 of the first planetary gear set 70 so that the synchronizer hub 96 may move the ring gear 84 axially between a first, second, and third position, via the synchronizer hub 96. In a number of variations, range selection may be performed by an actuator (not illustrated), which may selectively move the synchronizer hub 96 axially in relation to the axle assembly 22, 38. Any number of actuators may be used including, but not limited to, electromechanical, electromagnetic, and/or hydraulic.

In a number of variations, the synchronizer 94 may selectively disconnect the output differential 25, 39 from the electrical machine 122 to provide a neutral mode and may connect the electrical machine 122 with the differential 25, 39 to provide two operative modes (low and high) of power transmission. In a first mode, the synchronizer hub 96 may be selectively shifted axially to the left, which may cause the ring gear 84 of the first planetary gear set 70 to shift so that the ring gear 84 may be grounded to the housing 130 so that it may be fixed from rotation. When the ring gear 84 may be grounded, rotational speed of the carrier 82 of the first planetary gear set 70 may be reduced and torque may be increased so that the reduction gear train 60 may be performing in a low range mode of operation. In a second mode, the synchronizer hub 96 may be selectively shifted axially to the right, which may cause the ring gear 84 of the first planetary gear set 70 to shift so that the ring gear 84 may be operatively connected to the carrier 82 of the first planetary gear set 70 through the centerline support shaft 120 so that it may rotate with the carrier 82, which may be operatively connected to the centerline support shaft 120. When the ring gear 84 is connected to the carrier 82 through the centerline support shaft 120, rotational speed of the sun gear 72 may be maintained so that the reduction gear train 60 may be performing in a high range mode of operation.

In a number of variations, the output from the first planetary gear set 70 may be transferred to the second planetary gear set 98 to drive the output differential 25, 39. The second planetary gear set 98 may include a sun gear 100 and a first and second planetary gear 102, 104 operatively connected to the sun gear 100 so that the first and second planetary gears 102, 104 drive or are driven by the sun gear 100. The first and second planetary gears 102, 104 may be operatively attached to a carrier 110 through a first and second pin 106, 108, respectively, and may rotate within a ring gear 112. It is noted that more than two planetary gears may be used depending on design requirements. In a number of variations, the ring gear 112 of the second planetary gear set 98 may be grounded to the housing 130 at an extending annular wall 132 defined by a surface of the housing 130 so that it may be fixed from rotation. The second planetary gear set 98 may comprise any number of types of gears including, but not limited to, helical gears. In a number of variations, the range selector 94 may disconnect the ring gear 84 of the first planetary gear set 70 from the carrier 82 of the first planetary gear set 70 and the housing 130 so that the ring gear 84 is disconnected from the sun gear 100 of the second planetary gear set 98 to provide the neutral mode.

In a number of variations, an oiling system 134 may be in fluid communication with the chain 68 of the chain drive 62. The oiling system 134 may be constructed and arranged to spray oil on an inside surface 69 of the chain 68 to lubricate the chain 68. In one variation, the oiling system 134 may include a first conduit 136 and a second conduit 138 perpendicular to the first conduit 136. In a number of variations, the first conduit 136 and/or the second conduit 138 may be defined within an inner surface 131 of the housing 130 or may be tubing. In a number of variations, the first conduit 136 may be in fluid communication with an oil sump 148 and the second conduit 138 may extend to an inner surface 69 of the chain 68. The first conduit 136 may draw oil from the sump 148 and may direct the oil through the second conduit 138 so that oil may be sprayed out from the second conduit 138 onto the inner surface 69 of the chain 68. The above oiling system is for illustrative purposes only and it is noted that any number of oiling systems may be used to lubricate the chain.

In a number of variations, one or more features may be incorporated into the electrified axle assembly 18 to manage sump levels and reduce shear losses such as is disclosed in patent application Ser. No. 14/824,724, which is herein incorporated by reference.

Referring again to FIG. 1, the electrified axle assembly 18 may be the front axle assembly 22 in a rear-wheel drive configured vehicle 20. In a number of variations, the electric all-wheel drive vehicle 20 having a front wheel drive configuration may include a front driveline 21 and a rear driveline 26. The front driveline 21 may include a front axle assembly 22 that may drive a first wheel 23 and a second wheel 24 and may include a front differential 25, which may split rotational torque between the first wheel 23 and the second wheel 24. A transmission 31 may be operatively connected to the front driveline 21 and the rear driveline 26 and may generate and deliver torque from an engine 32 to the front driveline 21 and the rear driveline 26. The rear driveline 26 may include a rear axle assembly 27 that may drive a third wheel 28 and a fourth wheel 29 and may include a rear differential 30, which may split rotational torque between the third wheel 28 and the fourth wheel 29. In a number of variations, the front axle assembly 22 may be driven by an electrical machine 122 to provide electric all-wheel drive of the vehicle 20. The electrical machine 122 may be operatively attached to the front axle assembly 22 so that power may be transferred through the front driveline 21 so that the electrical machine 122 drives the front axle assembly 22 such as for propulsion, which may improve torque in a low voltage system including, but not limited to, a 48-volt system. Power may also be transferred through the front driveline 21 so that the front axle assembly 22 drives the electrical machine 122, such as for regenerative braking to charge the vehicle's battery.

Referring again to FIG. 2, the electrified axle assembly 18 may be the rear axle assembly 38 in a front-wheel drive configured vehicle 33. An electrical all-wheel drive vehicle 33 having a rear wheel drive configuration may include a front driveline 34 and a rear driveline 37. The front driveline 34 may include a front axle assembly 35 that may drive a first wheel 23 and a second wheel 24 and may include a front differential 36, which may split rotational torque between the first wheel 23 and the second wheel 24. A transmission 31 may be operatively connected to the front driveline 34 and may generate and deliver torque from an engine 32 to the front driveline 34. The rear driveline 37 may include a rear axle assembly 38 that may drive a third wheel 28 and a fourth wheel 29. In a number of variations, the rear axle assembly 38 may be driven by an electrical machine 122 to provide electric all-wheel drive. The electrical machine 122 may be operatively attached to the rear axle assembly 38 so that power may be transferred through the rear driveline 37 so that the electrical machine 122 drives the rear axle assembly 38 such as for propulsion, which may improve torque in a low voltage system including, but not limited to, a 48-volt system. Power may also be transferred through the rear driveline 37 so that the rear axle assembly 38 drives the electrical machine 122, such as for regenerative braking to charge the vehicle's battery.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a driveline comprising: an electrical machine; a chain drive operatively connected to the electrical machine; a first planetary gear set having multiple gear ratios operatively connected to the chain drive; a second planetary gear set having a fixed gear ratio operatively connected to the first planetary gear set; a range selector operatively connected to the first planetary gear set and positioned between the first planetary gear set and the second planetary gear set; a differential operatively connected to the second planetary gear set; an axle assembly operatively connected to and extending through the chain drive, the first planetary gear set, the range selector, the second planetary gear set, and the differential; wherein the electrical machine is constructed and arranged to selectively transmit power to the differential through the chain drive, the first planetary gear set, and the second planetary gear set or to selectively receive power through the chain drive, the first planetary gear set, the second planetary gear set, and the differential; and wherein the range selector is constructed and arranged to selectively shift the driveline into a high range mode, a low range mode, and a neutral mode.

Variation 2 may include a driveline as set forth in Variation 1, wherein a rotational axis of the electrical machine is offset from a rotational axis of the axle assembly.

Variation 3 may include a driveline as set forth in any of Variations 1-2, further comprising a housing surrounding at least a portion of the electrical machine, the chain drive, the first planetary gear set, the range selector, the second planetary gear set, the differential, and the axle assembly.

Variation 4 may include a driveline as set forth in Variation 3, wherein the range selector includes a hub, wherein the hub is operatively attached to a ring gear of the first planetary gear set, and wherein the range selector is constructed and arranged to shift the hub axially to move the ring gear to a first position, a second position, and a third position, wherein in the first position, the ring gear is grounded to the housing to achieve the low range mode, wherein in the second position the ring gear is operatively connected to the carrier of the first planetary gear set to achieve the high range mode, and wherein in the third position the ring gear is disconnected from the housing and the carrier of the first planetary gear set to achieve the neutral mode.

Variation 5 may include a driveline as set forth in any of Variations 1-4, wherein the chain drive comprises a first gear operably connected to a shaft of the electrical machine, a second gear operably connected to a sun gear of the first planetary gear set, and a chain operatively connected to the first gear and the second gear.

Variation 6 may include a driveline as set forth in Variation 5, wherein the chain is a high capacity, high velocity, and involute tooth chain.

Variation 7 may include a driveline as set forth in any of Variations 3-6, further comprising an oiling system within the housing constructed and arranged to lubricate an inner surface of a chain of the chain drive.

Variation 8 may include a driveline as set forth in Variation 7, wherein the oiling system comprises a first conduit in fluid communication with an oil sump and a second conduit in fluid communication with the first conduit constructed and arranged to spray the inner surface of the chain with oil from the oil sump.

Variation 9 may include a driveline as set forth in any of Variations 1-8, wherein the first planetary gear set and the second planetary gear set comprise helical gears.

Variation 10 may include a driveline as set forth in any of Variations 1-9, wherein the range selector is a synchronizer.

Variation 11 may include a driveline comprising an axle assembly comprising a first axle and a second axle coaxial with the first axle; a chain drive operatively connected to the axle assembly; a first helical planetary gear set including a sun gear, at least two planetary gears operatively connected to the sun gear, a ring gear, and a carrier, wherein the first helical planetary gear set is operatively connected to the chain drive and the first axle; a range selector operatively connected to the first helical planetary gear set and the first axle; a second helical planetary gear set including a sun gear, at least two planetary gears operatively connected to the sun gear, a ring gear, and a carrier, wherein the second helical planetary gear set is operatively connected to the first helical planetary gear set; a differential operatively connected to the second helical planetary gear set, the first axle, and the second axle; an electrical machine having a shaft operatively connected to the chain drive constructed and arranged to selectively drive or be driven by the chain drive; a housing surrounding at least a portion of the axle assembly, the chain drive, the first helical planetary gear set, the range selector, the second helical planetary gear set, and the differential; and wherein the range selector is constructed and arranged to axially move the ring gear of the first helical planetary gear set to shift the driveline to a high range mode, a neutral mode, and a low range mode.

Variation 12 may include a driveline as set forth in Variation 11, wherein in the high range mode the ring gear of the first helical planetary gear set is operatively connected to the carrier of the first helical planetary gear set, wherein in the low range mode the ring gear of the first helical planetary gear set is grounded to the housing, and wherein in the neutral mode the ring gear is disconnected from the housing and the carrier of the first helical planetary gear set.

Variation 13 may include a driveline as set forth in any of Variations 11-12, further comprising an oil system extending within the housing constructed and arranged to lubricate a chain of the chain drive.

Variation 14 may include a driveline as set forth in any of Variations 11-13, wherein the housing is constructed and arranged to contain a lubricant.

Variation 15 may include a driveline as set forth in any of Variations 11-14, wherein the chain drive comprises a first gear operatively connected to the shaft of the electrical machine, a second gear operatively connected to the sun gear of the first helical planetary gear set, and a chain operatively connected to the first gear and the second gear.

Variation 16 may include a driveline as set forth in Variation 15, wherein the chain is a high capacity, high velocity, and involute tooth chain.

Variation 17 may include a method of driving an axle differential comprising providing an electrical machine having a rotatable shaft; driving a chain system operatively connected to the rotatable shaft using the electrical machine; providing output from the chain system to a first planetary gear set having a sun gear, at least two planetary gears, a ring gear, and a carrier; shifting the ring gear to a first position to ground the ring gear to a housing to achieve a low range mode using a range selector or shifting the ring gear to a second position operatively connecting the ring gear to the carrier to achieve a high range mode using the range selector; driving a second planetary gear set with output from the first planetary gear set through the range selector; and driving the axle differential with output from the second planetary gear set.

Variation 18 may include a method as set forth in Variation 17, further comprising shifting the ring gear to a third position to disconnect the electrical machine from the axle differential using the range selector.

Variation 19 may include a method as set forth in any of Variations 17-18, further comprising lubricating an inner surface of a chain of the chain system using an oiling system.

Variation 20 may include a method as set forth in any of Variations 17-19, further comprising driving the electrical machine via output from the axle differential, the second planetary gear set, the first planetary gear set, and the chain system for regenerative braking.

The above description of select variations within the scope of the invention is merely illustrative in nature and, thus, variations or variants thereof are not to be regarded as a departure from the spirit and scope of the invention.

What is claimed is:
1. A driveline comprising:
an electrical machine;
a chain drive operatively connected to the electrical machine;
a first planetary gear set having multiple gear ratios operatively connected to the chain drive;
a second planetary gear set having a fixed gear ratio operatively connected to the first planetary gear set;
a range selector operatively connected to the first planetary gear set and positioned between the first planetary gear set and the second planetary gear set;
a differential operatively connected to the second planetary gear set;
an axle assembly operatively connected to and extending through the chain drive, the first planetary gear set, the range selector, the second planetary gear set, and the differential;
wherein the electrical machine is constructed and arranged to selectively transmit power to the differential through the chain drive, the first planetary gear set, and the second planetary gear set or to selectively receive power through the chain drive, the first planetary gear set, the second planetary gear set, and the differential; and
wherein the range selector is constructed and arranged to selectively shift the driveline into a high range mode, a low range mode, and a neutral mode;
wherein the axle differential, the second planetary gear set, the first planetary gear set, and the chain drive are constructed and arranged to drive the electric machine.

2. The driveline of claim 1, wherein a rotational axis of the electrical machine is offset from a rotational axis of the axle assembly.

3. The driveline of claim 1, further comprising a housing surrounding at least a portion of the electrical machine, the chain drive, the first planetary gear set, the range selector, the second planetary gear set, the differential, and the axle assembly.

4. The driveline of claim 3, wherein the range selector includes a hub, wherein the hub is operatively attached to a ring gear of the first planetary gear set, and wherein the range selector is constructed and arranged to shift the hub axially to move the ring gear to a first position, a second position, and a third position, wherein in the first position, the ring gear is grounded to the housing to achieve the low range mode, wherein in the second position the ring gear is operatively connected to the carrier of the first planetary gear set to achieve the high range mode, and wherein in the third position the ring gear is disconnected from the housing and the carrier of the first planetary gear set to achieve the neutral mode.

5. The driveline of claim 3, further comprising an oiling system within the housing constructed and arranged to lubricate an inner surface of a chain of the chain drive.

6. The driveline of claim 5, wherein the oiling system comprises a first conduit in fluid communication with an oil sump and a second conduit in fluid communication with the first conduit constructed and arranged to spray the inner surface of the chain with oil from the oil sump.

7. The driveline of claim 1, wherein the chain drive comprises a first gear operably connected to a shaft of the electrical machine, a second gear operably connected to a sun gear of the first planetary gear set, and a chain operatively connected to the first gear and the second gear.

8. The driveline of claim 1, wherein the first planetary gear set and the second planetary gear set comprise helical gears.

9. The driveline of claim 1, wherein the range selector is a synchronizer.

10. A driveline comprising:
an axle assembly comprising a first axle and a second axle coaxial with the first axle;
a chain drive operatively connected to the axle assembly;
a first helical planetary gear set including a sun gear, at least two planetary gears operatively connected to the sun gear, a ring gear, and a carrier, wherein the first helical planetary gear set is operatively connected to the chain drive and the first axle;
a range selector operatively connected to the first helical planetary gear set and the first axle;
a second helical planetary gear set including a sun gear, at least two planetary gears operatively connected to the sun gear, a ring gear, and a carrier, wherein the second helical planetary gear set is operatively connected to the first helical gear set;
a differential operatively connected to the second helical planetary gear set, the first axle, and the second axle;

an electrical machine having a shaft operatively connected to the chain drive constructed and arranged to selectively drive or be driven by the chain drive;

a housing surrounding at least a portion of the axle assembly, the chain drive, the first helical planetary gear set, the range selector, the second helical planetary gear set, and the differential; and wherein the range selector is constructed and arranged to axially move the ring gear of the first helical planetary gear set to shift the driveline to a high range mode, a neutral mode, and a low range mode;

wherein the axle differential, the second planetary gear set, the first planetary gear set, and the chain drive are constructed and arranged to drive the electric machine.

11. The driveline of claim 10, wherein in the high range mode the ring gear of the first helical planetary gear set is operatively connected to the carrier of the first helical planetary gear set, wherein in the low range mode the ring gear of the first helical planetary gear set is grounded to the housing, and wherein in the neutral mode the ring gear is disconnected from the housing and the carrier of the first helical planetary gear set.

12. The driveline of claim 10, further comprising an oil system extending within the housing constructed and arranged to lubricate a chain of the chain drive.

13. The driveline of claim 10, wherein the housing is constructed and arranged to contain a lubricant.

14. The driveline of claim 10, wherein the chain drive comprises a first gear operatively connected to the shaft of the electrical machine, a second gear operatively connected to the sun gear of the first helical planetary gear set, and a chain operatively connected to the first gear and the second gear.

15. A method of driving an axle differential comprising:
providing an electrical machine having a rotatable shaft;
driving a chain system operatively connected to the rotatable shaft using the electrical machine;
providing output from the chain system to a first planetary gear set having a sun gear, at least two planetary gears, a ring gear, and a carrier;
shifting the ring gear to a first position to ground the ring gear to a housing to achieve a low range mode using a range selector or shifting the ring gear to a second position operably connecting the ring gear to the carrier to achieve a high range mode using the range selector;
driving a second planetary gear set with output from the first planetary gear set through the range selector; and
driving the axle differential with output from the second planetary gear set, further comprising driving the electrical machine via output from the axle differential, the second planetary gear set, the first planetary gear set, and the chain system for regenerative braking.

16. The method of claim 15, further comprising shifting the ring gear to a third position to disconnect the electrical machine from the axle differential using the range selector.

17. The method of claim 15, further comprising lubricating an inner surface of a chain of the chain system using an oiling system.

* * * * *